(12) United States Patent
Punal et al.

(10) Patent No.: US 12,107,964 B2
(45) Date of Patent: Oct. 1, 2024

(54) TECHNIQUE FOR COMPUTING A BLOCK IN A BLOCKCHAIN NETWORK

(71) Applicant: Telefonaktiebolaget LM Ericsson (publ), Stockholm (SE)

(72) Inventors: Oscar Punal, Herzogenrath (DE); Mohammad Hossein Jafari, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 979 days.

(21) Appl. No.: 17/043,027

(22) PCT Filed: Mar. 29, 2018

(86) PCT No.: PCT/EP2018/058149
§ 371 (c)(1),
(2) Date: Sep. 29, 2020

(87) PCT Pub. No.: WO2019/185148
PCT Pub. Date: Oct. 3, 2019

(65) Prior Publication Data
US 2021/0021424 A1  Jan. 21, 2021

(51) Int. Cl.
*H04L 9/00* (2022.01)
*G06F 11/30* (2006.01)
(Continued)

(52) U.S. Cl.
CPC ........ *H04L 9/3236* (2013.01); *G06F 11/3006* (2013.01); *G06F 16/2465* (2019.01); *H04L 9/50* (2022.05)

(58) Field of Classification Search
CPC ....... H04L 9/3236; H04L 9/50; H04L 9/3239; G06F 11/3006; G06F 16/2465
See application file for complete search history.

(56) References Cited

U.S. PATENT DOCUMENTS

2017/0228734 A1  8/2017  Kurian
2017/0244721 A1*  8/2017  Kurian .................... H04L 63/08
(Continued)

OTHER PUBLICATIONS

International Search Report and Written Opinion issued in International Application No. PCT/EP2018/058149 dated Nov. 7, 2018 (13 pages).
(Continued)

*Primary Examiner* — Trong H Nguyen
(74) *Attorney, Agent, or Firm* — Rothwell, Figg, Ernst & Manbeck, P.C.

(57) ABSTRACT

A technique for controlling participation of a miner in a computation of a block for a message to be added to a blockchain in a blockchain network is disclosed. The miner is configured to perform block computation for messages of one or more security levels available in the blockchain network. A method implementation of the technique is performed by the miner and comprises receiving (S308) the message, checking (S310) whether a security level indication associated with the message matches one of the one or more security levels configured for the miner to determine whether the miner is to participate in the computation of the block for the message, and starting (S312) to compute the block for the message if it is determined that the miner is to participate in the computation of the block for the message.

19 Claims, 12 Drawing Sheets

(51) Int. Cl.
*G06F 16/2458* (2019.01)
*H04L 9/32* (2006.01)

(56) References Cited

U.S. PATENT DOCUMENTS

2020/0097837 A1* 3/2020 Naqvi .................... G06N 5/02
2020/0104809 A1* 4/2020 Destefanis ............. G06Q 10/06
2021/0194690 A1* 6/2021 Fletcher ................ H04L 9/3218

OTHER PUBLICATIONS

Bruno Rodrigues et al., Enabling a Cooperative, Multi-domain DDoS Defense by a Blockchain Signaling System (BloSS), 42nd IEEE, (2017) (3 pages).
Ittai Abraham et al., "Solida: A Blockchain Protocol Based on Reconfigurable Byzantine Consensus", (Nov. 18, 2017) (17 pages).
Satoshi Nakamoto et al., "Bitcoin: A Peer-to-Peer Electronic Cash System", (2008) (9 pages).

\* cited by examiner

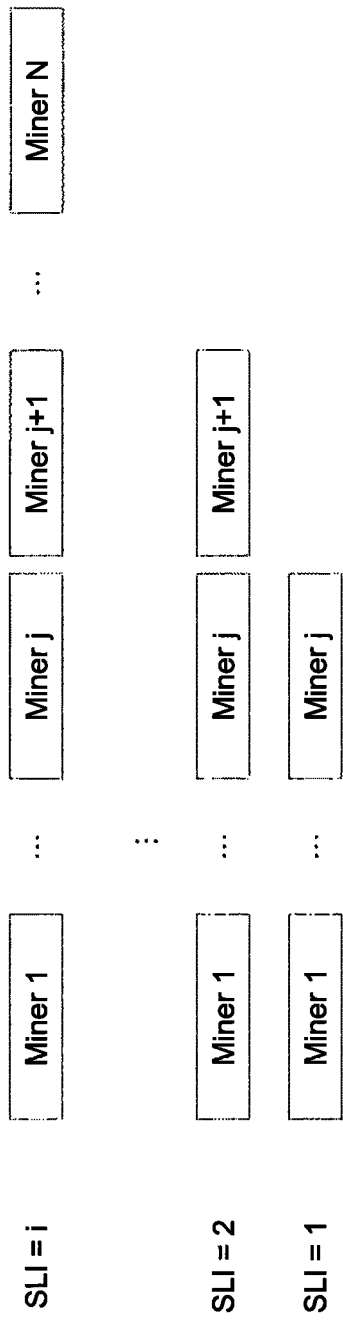

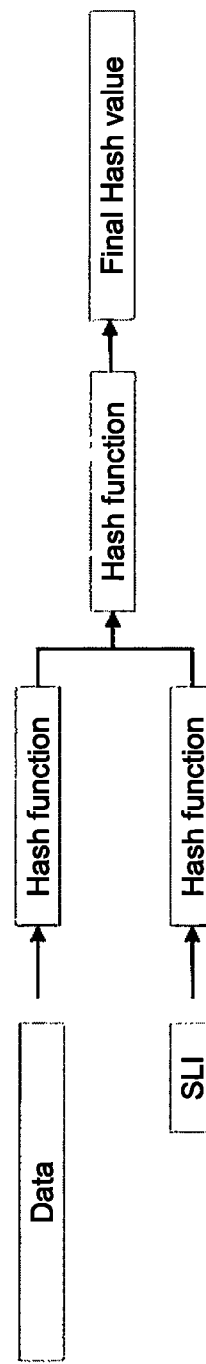
Fig. 5a
Fig. 5b

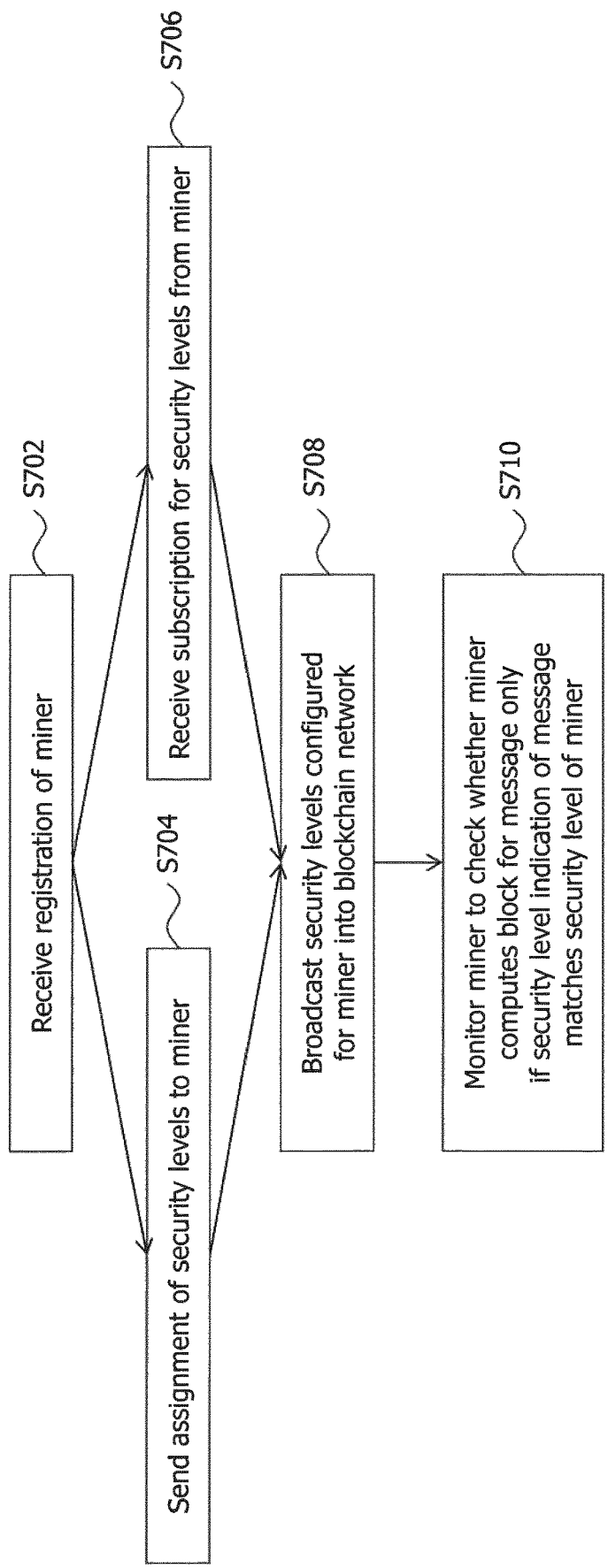

TECHNIQUE FOR COMPUTING A BLOCK IN A BLOCKCHAIN NETWORK

CROSS REFERENCE TO RELATED APPLICATION(S)

This application is a 35 U.S.C. § 371 National Stage of International Patent Application No. PCT/EP2018/058149, filed Mar. 29, 2018, designating the United States.

TECHNICAL FIELD

The present disclosure generally relates to blockchain networks. In particular, a technique for controlling participation of a miner in a computation of a block for a message to be added to a blockchain in a blockchain network is presented. The technique may be embodied in methods, computer programs, apparatuses and systems.

BACKGROUND

Blockchains have originally been proposed for use as public transaction ledger of the cryptocurrency "bitcoin" and have in the recent years emerged as general-purpose systems that allow for a decentralized, transparent and secure validation of messages. Messages exchanged in blockchain networks can principally include any type of information, ranging from cryptocurrencies to legal documents, for example.

Traditionally, a centralized trusted party has been used to validate messages, e.g., a bank institution for validating financial transactions. While these traditional architectures may work well for many systems, they generally have the drawback that the centralized trusted party may become a single target of attack. Blockchain technology, on the other hand, aims at removing the need for centralized trusted parties, reducing the time for validating messages and increasing transparency. In particular, blockchain-based systems aim at allowing any two nodes in a network to exchange messages in a decentralized and trusted manner.

Blockchain networks are based on the concept of maintaining a distributed ledger which keeps track of all messages exchanged in the network. A blockchain corresponds to a continuously extendable list of records, so called blocks, which are linked using cryptographic techniques. Typically, each block contains a cryptographic hash of the previous block in the chain, a timestamp and data. For use as a distributed ledger, a blockchain is managed by a peer-to-peer network, i.e., the blockchain network, in which all nodes collectively adhere to a protocol for validating new blocks. By design, a blockchain is inherently resistant to modification of the data because, once recorded, the data in any given block cannot be altered retroactively without alteration of all subsequent blocks, which would require consensus among the majority of nodes in the network.

FIG. 1 exemplarily illustrates a portion of a single blockchain and the generic content of the blocks. As can be seen, each block contains the hash value of the previous block and, therefore, a chain dependency is established which protects against illegitimate modification of a message in a block, by requiring recalculation of any block generated after the modified block. Messages exchanged between the nodes of the network are stored in the blocks of the blockchain, wherein each message may comprise user data and a digital signature, e.g., the encrypted hash value of the user data. A message may be defined as Msg=D+H(D), where Msg denotes the message, D stands for the data included in the message and H( ) corresponds to a hash function.

New blocks are created by a consensus procedure among the nodes of the network and, once created, new blocks are appended to the chain. A typical consensus procedure is the so called "proof-of-work" method which corresponds to the procedure of searching for a hash value with a specific requirement, i.e., searching for a specific hash value that is obtained after applying a hash function on the whole content of a block. The difficulty of computing this hash value is determined by the number of zero bits that must exist at the beginning of the hash value. This number of zero bits is also known as the "degree of difficulty". By imposing a higher/lower number of zeros at the beginning of the hash value, the computational complexity can be increased/reduced. For computing the hash value, a so called "nonce", i.e., a random value that forms part of a block, may be employed. The nonce is modified randomly in the proof-of-work procedure to find the desired target hash value for the whole block. Different hash values may thus be obtained by modifying the nonce and/or adding new incoming messages. Finding the solution in the proof-of-work procedure is generally associated with high computational effort. It is to be noted that the proof-of-work method is not the only available consensus procedure and that other consensus methods are generally known, including proof-of-state, proof-of-capacity, proof-of-burn and proof-of-activity, for example.

In a blockchain network, nodes which are responsible for computing blocks, e.g., which participate in performing the proof-of-work, are called "miners". To compute a new block, miners may collect all recent messages which are not yet included in the chain and combine the hash values obtained from the messages with the hash value of the previous block, the timestamp and the nonce (as depicted in FIG. 1). Next, a hash function is applied on this combined data, which results in a hash value of the new block. Miners perform this computation repeatedly (by modifying the nonce and/or adding new incoming messages) until a solution to the proof-of-work is found. The first miner that finds a solution broadcasts the computed block to the other nodes in the network and, if the other nodes validate the block, the block is added to the chain.

When a new message is thus to be added to the blockchain, the following steps are typically executed in the blockchain network: (1) the new message is broadcast from the originating node into the network and received by all nodes, (2) the message is validated by all nodes and every node broadcasts the result of the validation, i.e., indicating whether the message is considered valid or not, (3) if the message is accepted, i.e., the majority of the nodes determine the message as valid, the miners start the computation of the block (e.g., the proof-of-work computation) for the message, (4) the first miner that finds a solution (e.g., to the proof-of-work) broadcasts the computed block into the network, (5) the other nodes validate the solution and broadcast the validation result into the network, i.e., indicating whether the solution is accepted or rejected, and (6) if the solution is accepted, i.e., the majority of the nodes accept the solution, the block is added to the chain and the nodes update their ledger accordingly.

The validation of messages in step (2) above may be performed using known digital signatures, e.g., each message may be digitally signed by the originating node of the message by applying a hash function on the data of the message and encrypting the obtained hash value with the private key of the originating node. The receiving nodes may then validate the message by decrypting the digital signature using the public key of the originating node, by computing the hash value of the data, and by comparing the received hash value with the computed hash value.

From the above procedure, it becomes apparent that the majority of nodes decide on the validation of messages and the validation of blocks. This means that the amount of computational power is generally proportional to the security level, i.e., a higher/lower security level can be achieved by increasing/decreasing the number of computational power. The security level may correspond to the robustness of the data carried within the messages against modification by attackers. It follows that blockchain technology generally achieves higher security levels at the cost of higher computational power. Since, in typical blockchain networks, all nodes can act as miners, this effectively results in a significantly higher energy consumption compared to the central trust-based systems mentioned above.

In fact, nowadays, cryptocurrencies that use blockchain technology are responsible for a significant amount of the total worldwide energy consumption and, if this technology continues to be applied for even more applications and use cases, the ever-rising energy consumption may likely trigger governmental institutions to define a set of rules to limit the energy consumption of blockchain-based systems.

SUMMARY

Accordingly, there is a need for a technique for computing blocks in a blockchain network that avoids one or more of the problems discussed above, or other problems.

According to a first aspect, a method for controlling participation of a miner in a computation of a block for a message to be added to a blockchain in a blockchain network is provided. The miner is configured to perform block computation for messages of one or more security levels available in the blockchain network. The method is performed by the miner and comprises receiving the message, checking whether a security level indication associated with the message matches one of the one or more security levels configured for the miner to determine whether the miner is to participate in the computation of the block for the message, and starting to compute the block for the message if it is determined that the miner is to participate in the computation of the block for the message.

When the miner starts to compute the block for the message, the miner may be one of a plurality of miners in the blockchain network that start to compute the block as part of a consensus procedure employed in the blockchain network, and thereby "participate" in the computation of the block. Each participating miner may start to compute the block separately (e.g., in parallel), wherein the first miner that successfully completes computing the block may notify the other miners to reach consensus about the computed block. The consensus procedure may be a proof-based procedure, such as one of the proof-of-work, proof-of-state, proof-of-capacity, proof-of-burn, or proof-of-activity procedures mentioned above. In case of the proof-of-work procedure, for example, each of the plurality of miners may start computing a proof-of-work for the block, wherein the first miner which finds a solution to the proof-of-work may broadcast the solution to the other miners for validation. If the other miners accept the solution, the block may be added to the blockchain and the nodes of the blockchain network may update their ledger accordingly. The general procedure of computing the block for the message may correspond to the block creation procedure for new messages to be added to a blockchain described above for traditional blockchain networks. Unnecessary repetitions are thus omitted at this point. The message received by the miner may correspond to a message which is sent (e.g., broadcast) from an originating node to a destination node in the blockchain network, wherein the miners receive the message for validation and block computation purposes. The blockchain network may comprise a plurality of nodes, wherein each of the plurality of nodes (or a subset thereof) may act as miner that may participate in computing the block for the message to be added to the blockchain.

Rather than in traditional blockchain networks, according to the technique presented herein, participation of the miners in the block computation for messages exchanged in the blockchain network may be controlled based on security level indications associated with the messages. For this purpose, each miner may be configured to perform block computation for messages of one or more particular security levels defined by the blockchain network and, depending on the security level indication associated with the received message, the miner may participate in the computation of the block for the message (e.g., only) when the security level indication associated with the message corresponds to one of the one or more security levels configured for the miner, i.e., in other words, when the miner is configured to be responsible for computing the block for the message. By setting the security level indication for a message, it may be controlled that certain miners participate in the computation of the block for the message, while others do not participate. If it is determined that a miner is not to participate in the computation of the block for the message, the miner may not start to compute the block for the message, e.g., the miner may simply ignore the message for block computation.

Controlling participation of miners in the computation of the block for a message on the basis of security levels generally stems from the observation that information being exchanged in a blockchain network may have different security requirements (e.g., in terms of confidentiality, integrity, and availability of data). While, for messages which carry sensitive data, higher security requirements may apply, messages which carry less sensitive data may have lower security requirements. This may be the case in networks that offer blockchain-based services to different applications, for example. As an example, a firmware update for an industrial Internet of Things (IoT) device may require a higher level of security than the data which is generated by a temperature sensor in the IoT environment. Using the technique presented herein, different security requirements may be reflected by the security level indication associated with the message. The security level indication associated with the message may thus correspond to a level of sensitivity of data included in the message or, in other words, the security level indication associated with the message may classify the data included in the message based on its security demands. A higher/lower security level may indicate higher/lower security requirements.

In blockchain networks, the level of security provided for a message to be added to the blockchain may be directly related to the computational power that is spent for the computation of the block. This is because, as the number of processors in the blockchain network increases (e.g., more miners and/or more CPUs per miner are available), the degree of difficulty of the consensus procedure (e.g., the proof-of-work computation) may generally need to increase if the average time for computing a block is to be constant. Consequently, a higher security level may be achieved when a higher number of miners participates in the computation of the block, whereas a lower security level may result from the fact that a lower number of miners participates in the computation of the block. For messages with lower security requirements, utilizing all miners in the blockchain network may waste computational power and unnecessarily increase energy consumption. The security level indication associated with the message may thus be used to control the level of computational power and energy consumption required for the computation of the block, depending on the level of security required for the message.

The security level indication associated with the message may be set by the originating node of the message in the blockchain network. In particular, the security level indication may be included in the message so that, when the miner checks whether the security level indication matches one of the one or more security levels configured for the miner, the miner may directly read the security level indication from the message and proceed accordingly. The security level indication may be added to the message by the originating node when generating the message, for example. It will be understood that other ways of conveying the security level indication associated with the message to the miner are generally conceivable.

As said, the miner may be configured to perform block computation for messages of one or more particular security levels. The miner may thus be configurable with the one or more security levels, and configuring the miner with the one or more security levels may involve an interaction with a managing node of the blockchain network.

For example, the miner may register, prior to receiving the message, the miner with the blockchain network (e.g., with the managing node). In one variant, the miner may then receive, prior to receiving the message, an assignment of the one or more security levels from the managing node of the blockchain network for configuring the miner to perform block computation for messages of the one or more security levels.

In this case, the one or more security levels may be determined by a network operator and be assigned to the miner, for example. In another variant, the miner may subscribe, prior to receiving the message, for the one or more security levels at the managing node of the blockchain network for configuring the miner to perform block computation for messages of the one or more security levels. In this case, the miner may select autonomously for which security levels the miner desires to perform block computation.

In an exemplary subscription procedure, the miner may register with a network operator's server which, in turn, may return a secure temporary ticket to both the miner and the managing node. The miner may then generate a private key and a public key, sign the ticket with the private key and send it to the managing node. The managing node, in turn, may check the validity of the ticket and the signature of the miner and, if the ticket is determined to be valid, the managing node may broadcast the miner's public key as well as the list of supported service level indications of that miner into the blockchain network to inform the nodes of the blockchain network (including the originating node of the message) about the one or more security levels configured for the miner. If, on the other hand, the ticket is determined to be invalid, the managing node may send a rejection to the miner, for example.

The managing node may be an Operation Support System (OSS) node of the network, for example, but it will be understood that other nodes of the blockchain network may act as managing node as well. Further, the miner may authenticate itself to the blockchain network (e.g., to the managing node) in order to make the miner identifiable for the blockchain network. This may allow the blockchain network (e.g., the managing node) to monitor the miner to check whether the miner starts computing the block for the message only if a security level indication associated with the message matches one of the one or more security levels configured for the miner.

The above-mentioned registration, subscription and/or authentication procedures may be required to implement the technique presented herein in both public blockchain networks (where, traditionally, any node can participate in a blockchain-based service, such as in globally available cryptocurrencies) and private blockchain networks. An example of a private blockchain network may be a mobile network in which the network operator provides blockchain-based services to end users. In such a case, nodes of the mobile network itself and/or nodes external to the mobile network (which are authenticated with the network) may act as miners. In the latter case, the external miners (e.g., end user devices) may be rewarded by the network operator to compensate for the offered computational resources, for example.

As stated above, in one variant, the security level indication associated with the message may be included in the message. In one such variant, the security level indication may be incorporated into the message before applying a hash function to the message. In this case, the hash value of the message may correspond to a hash value generated from data included in the message and the security level indication. In another variant, the security level indication may be hashed separately from the data and, then, the hash value of the data and the hash value of the security level indication may be combined to obtain a final hash value. In this case, the hash value of the message may correspond to a hash value generated from a hash value of data included in the message and a hash value of the security level indication. In both of these variants, the (direct or indirect) inclusion of the security level indication into the calculation of the hash value of the message may cause that different hash values result from different security level indications, even though the data included in the message may be the same. The miner may then obtain the security level indication from the message by computing hash values of the message with different assumed security level indications and comparing the computed hash values with the actual hash value of the message, for example.

It will be understood that such variants of including the security level indication in the message are merely exemplary and that other forms of inclusion are generally conceivable. It is even conceivable that the security level indications are sent directly (e.g., unhashed) to the miners. The number of bits required for inclusion of the security level indications in the messages may depend on the number of security levels defined by the blockchain network. The security level indications may be added at the application layer and may therefore not affect lower protocol layers. If the security level indication is included into the calculation of the hash value of the message, as described above, the length of data in lower protocol layers remains the same as in traditional blockchains systems because the hash value of the message computed at the application layer always has the same length.

In one implementation, the blockchain may be a single blockchain in the blockchain network. In such a case, all validated blocks may be stored in the single blockchain, regardless of the values of the security level indications associated with the messages that become part of a block. As the number of miners that compute the block may vary depending on the security level, as described above, the security levels of the blocks of the blockchain (and the associated degrees of difficulty used for computing the blocks, for example) may differ.

In another implementation, the blockchain network may support multiple blockchains In such a case, the blockchain may be one of a plurality of blockchains of the blockchain network and the miner may be responsible for computing blocks of the plurality of blockchains. Each of the plurality of blockchains may have a chain identifier, and the chain identifier of the respective blockchain may correspond to (or match) the security level indication of all messages added to the respective blockchain. In other words, each of the multiple blockchains may specifically contain validated blocks computed for messages which have a particular security level indication value only. When a message is to be added to one of the plurality of blockchains, the miner may add the block for the message (once successfully computed) to the blockchain which has a chain identifier that corresponds to the security level indication of the message. In this way, messages may be stored in different blockchains based on their security level indication and it may thus be ensured that messages which are associated with a higher/lower security level indication end up in a blockchain that supports a higher/lower security level.

In a still further implementation, the blockchain may be one of a plurality of blockchains of the blockchain network as well. In this implementation, however, each of the plurality of blockchains may include a distinct cluster of security level indications of messages added to the respective blockchain. In such a case, each of the plurality of blockchains may include messages of several security levels (i.e., a cluster of security level indications). When a message is to be added to one of the plurality of blockchains, the miner may first determine to which of the distinct clusters of security level indications the message belongs and, once successfully computed, add the block to the corresponding blockchain. This implementation may be seen as a hybrid approach of the single blockchain case and the multiple blockchain case described above.

According to a second aspect, a method for controlling participation of a plurality of miners in a computation of a block for a message to be added to a blockchain in a blockchain network is presented. Each of the plurality of miners is configured to perform block computation for messages of one or more security levels available in the blockchain network. The method is performed by an originating node of the message and comprises sending the message to the plurality of miners, the message being associated with a security level indication enabling each of the plurality of miners to determine whether the respective miner is to participate in the computation of the block for the message by checking whether the security level indication associated with the message matches one of the one or more security levels configured for the respective miner.

The method according to the second aspect defines a method from the perspective of an originating node which may be complementary to the method performed by the miner according to the first aspect. The miner and the originating node of the second aspect may correspond to the miner and the originating node described above in relation to the first aspect. As such, those aspects described with regard to the method of the first aspect which are applicable to the method of the second aspect may be comprised by the method of the second aspect as well, and vice versa. Unnecessary repetitions are thus omitted in the following.

As in the method of the first aspect, the security level indication associated with the message may correspond to a level of sensitivity of data included in the message. In order to include the security level indication associated with the message into the message, the originating node may compute, in one variant, a hash value of the message as a hash value generated from data included in the message and the security level indication. In another variant, the originating node may compute the hash value of the message as a hash value generated from a hash value of data included in the message and a hash value of the security level indication.

In order to know about the security levels supported by the miners of the blockchain network and to be able to control participation of the plurality of miners in the computation of the block for the message, the originating node may receive, for each of the plurality of miners, the one or more security levels configured for the respective miner from a managing node of the blockchain network. The managing node may correspond to the managing node described above in relation to the first aspect.

In one implementation, the blockchain may be one of a plurality of blockchains of the blockchain network, wherein each of the plurality of blockchains may have a chain identifier, and wherein the chain identifier of the respective blockchain may correspond to the security level indication of all messages added to the respective blockchain. In another implementation, the blockchain may be one of a plurality of blockchains of the blockchain network, wherein each of the plurality of blockchains may include a distinct cluster of security level indications of messages added to the respective blockchain.

According to a third aspect, a method for controlling participation of a miner in a computation of a block for a message to be added to a blockchain in a blockchain network is presented. The miner is configured to perform block computation for messages of one or more security levels available in the blockchain network. The method is performed by a managing node of the blockchain network and comprises monitoring the miner to check whether the miner computes the block for the message only if a security level indication associated with the message matches one of the one or more security levels configured for the miner.

The method according to the third aspect defines a method from the perspective of a managing node which may be complementary to the method performed by the miner according to the first aspect and/or the method performed by the originating node according to the second aspect. The miner, the originating node and the managing node of the third aspect may correspond to the miner, the originating node and the managing node described above in relation to the first aspect and/or the second aspect. As such, those aspects described with regard to the methods of the first and second aspects which are applicable to the method of the third aspect may be comprised by the method of the third aspect as well, and vice versa. Unnecessary repetitions are omitted in the following.

As in the method of the first aspect, configuring the miner with the one or more security levels may involve an interaction with the managing node. In one such variant (e.g., in which the one or more security levels may be defined by a network operator), the managing node may send, prior to monitoring the miner, an assignment of the one or more security levels to the miner for configuring the miner to perform block computation for messages of the one or more security levels. In another such variant (e.g., in which the miner may select autonomously for which security levels the miner desires to perform block computation), the managing node may receive, prior to monitoring the miner, a subscription for the one or more security levels from the miner for configuring the miner to perform block computation for messages of the one or more security levels. In order to inform the nodes of the blockchain network (including the originating node of the message) about the one or more security levels configured for the miner, the managing node may broadcast the one or more security levels configured for the miner into the blockchain network.

As in the methods of the first and second aspects, in one implementation, the blockchain may be one of a plurality of blockchains of the blockchain network, wherein each of the plurality of blockchains may have a chain identifier, and wherein the chain identifier of the respective blockchain may correspond to the security level indication of all messages added to the respective blockchain. In another implementation, the blockchain may be one of a plurality of blockchains of the blockchain network, wherein each of the plurality of blockchains may include a distinct cluster of security level indications of messages added to the respective blockchain.

According to a fourth aspect, a computer program product is provided. The computer program product comprises program code portions for performing the method of at least one of the first, the second and the third aspect when the computer program product is executed on one or more computing devices (e.g., a processor or a distributed set of processors). The computer program product may be stored on a computer readable recording medium, such as a semiconductor memory, DVD, CD-ROM, and so on.

According to a fifth aspect, a miner for participating in a computation of a block for a message to be added to a blockchain in a blockchain network is provided. The miner is configured to perform block computation for messages of one or more security levels available in the blockchain network, and the miner is configured to perform any of the method steps presented herein with respect to the first aspect.

The miner may comprise at least one processor and at least one memory, wherein the at least one memory contains instructions executable by the at least one processor such that the miner is operable to perform any of the method steps presented herein with respect to the first aspect.

According to a sixth aspect, an originating node for controlling participation of a plurality of miners in a computation of a block for a message to be added to a blockchain in a blockchain network is provided. Each of the plurality of miners is configured to perform block computation for messages of one or more security levels available in the blockchain network. The originating node is configured to perform any of the method steps presented herein with respect to the second aspect.

The originating node may comprise at least one processor and at least one memory, wherein the at least one memory contains instructions executable by the at least one processor such that the originating node is operable to perform any of the method steps presented herein with respect to the second aspect.

According to a seventh aspect, a managing node for controlling participation of a miner in a computation of a block for a message to be added to a blockchain in a blockchain network is provided. The miner is configured to perform block computation for messages of one or more security levels available in the blockchain network. The managing node being configured to perform any of the method steps presented herein with respect to the third aspect.

The managing node may comprise at least one processor and at least one memory, wherein the at least one memory contains instructions executable by the at least one processor such that the managing node is operable to perform any of the method steps presented herein with respect to the third aspect.

According to an eighth aspect, there is provided a system comprising a plurality of miners according to the fifth aspect, an originating node according to the sixth aspect and, optionally, a managing node according to the seventh aspect.

BRIEF DESCRIPTION OF THE DRAWINGS

Embodiments of the technique presented herein are described herein with reference to the accompanying drawings, in which:

FIG. 4 illustrates an exemplary assignment of security levels to a plurality of miners in a blockchain network according to the present disclosure;

FIGS. 5a and 5b illustrate variants of incorporating a security level indication into a message by including the security level indication into the computation of the hash value of the message;

FIGS. 7a and 7b illustrate a modular composition of the managing node and a corresponding method embodiment which may be performed by the managing node;

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 1:
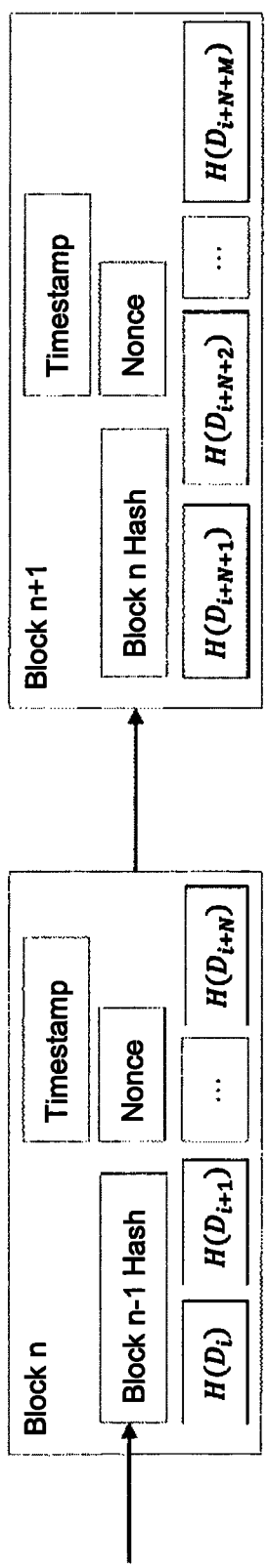
FIG. 1 illustrates an exemplary portion of a single blockchain and the contents of blocks.
Figure 2A:
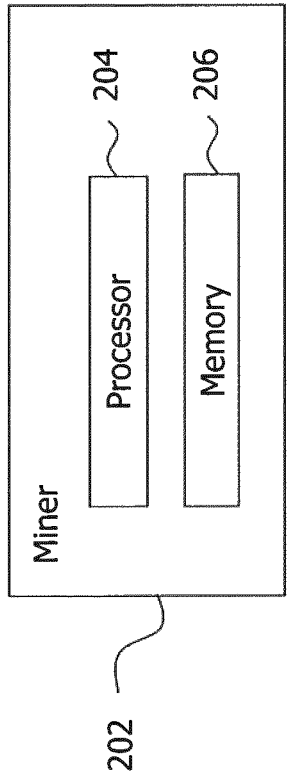
FIGS. 2a to 2c illustrate exemplary compositions of a miner, an originating node and a managing node of the blockchain network according to the present disclosure.

FIG. 2a illustrates an exemplary composition of a miner 202. The miner 202 may comprise at least one processor 204 and at least one memory 206, wherein the at least one memory 206 contains instructions executable by the at least one processor 204 such that the miner 202 is operable to carry out the method steps described herein with reference to a "miner".

Figure 2B:
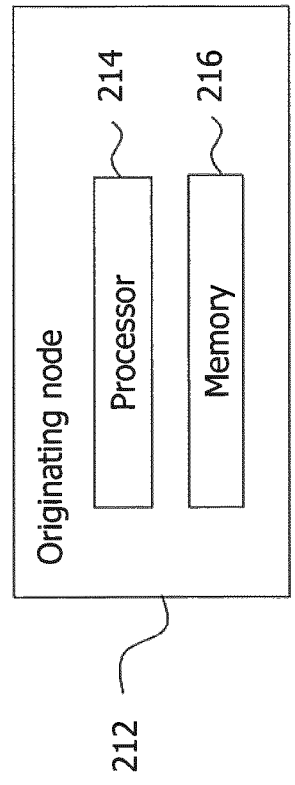

FIG. 2b illustrates an exemplary composition of originating node 212. The originating node 212 may comprise at least one processor 214 and at least one memory 216, wherein the at least one memory 216 contains instructions executable by the at least one processor 214 such that the originating node 212 is operable to carry out the method steps described herein with reference to an "originating node".

Figure 2C:
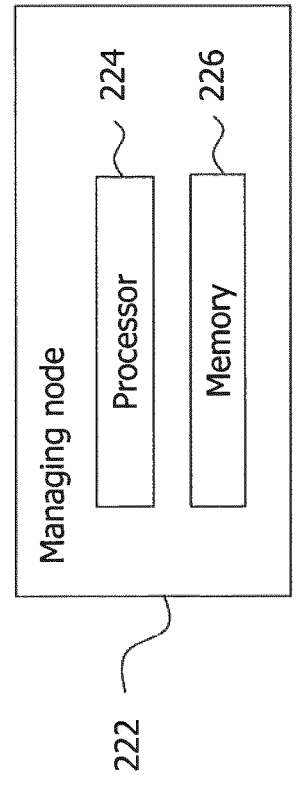

FIG. 2c illustrates an exemplary composition of a managing node 222. The managing node 222 may comprise at least one processor 224 and at least one memory 226, wherein the at least one memory 226 contains instructions executable by the at least one processor 224 such that the managing node 222 is operable to carry out the method steps described herein with reference to a "managing node".

It will be understood that the miner 202, the originating node 212 and the managing node 222 may correspond to physical computing units (or simply, devices), but may be virtualized computing units as well, such as a virtual machines, for example. It will further be understood that the miner 202, the originating node 212 and the managing node 222 do not necessarily have to be standalone computing units, but may be implemented as components—realized in software and/or hardware—on a single or on multiple computing units (being either physical or virtual) as well.

Figure 3A:
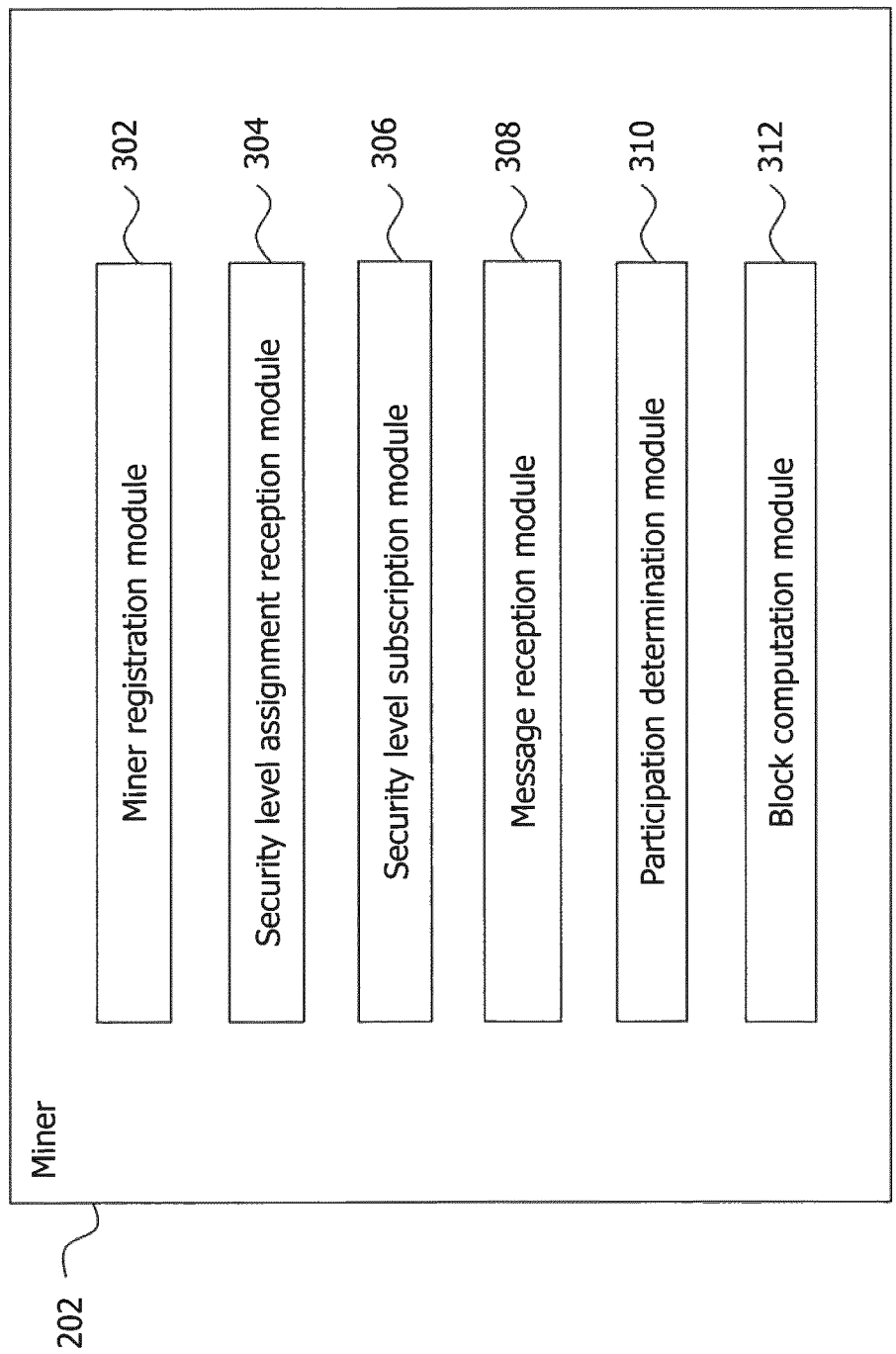
FIGS. 3a and 3b illustrate a modular composition of the miner and a corresponding method embodiment which may be performed by the miner.
Figure 3B:
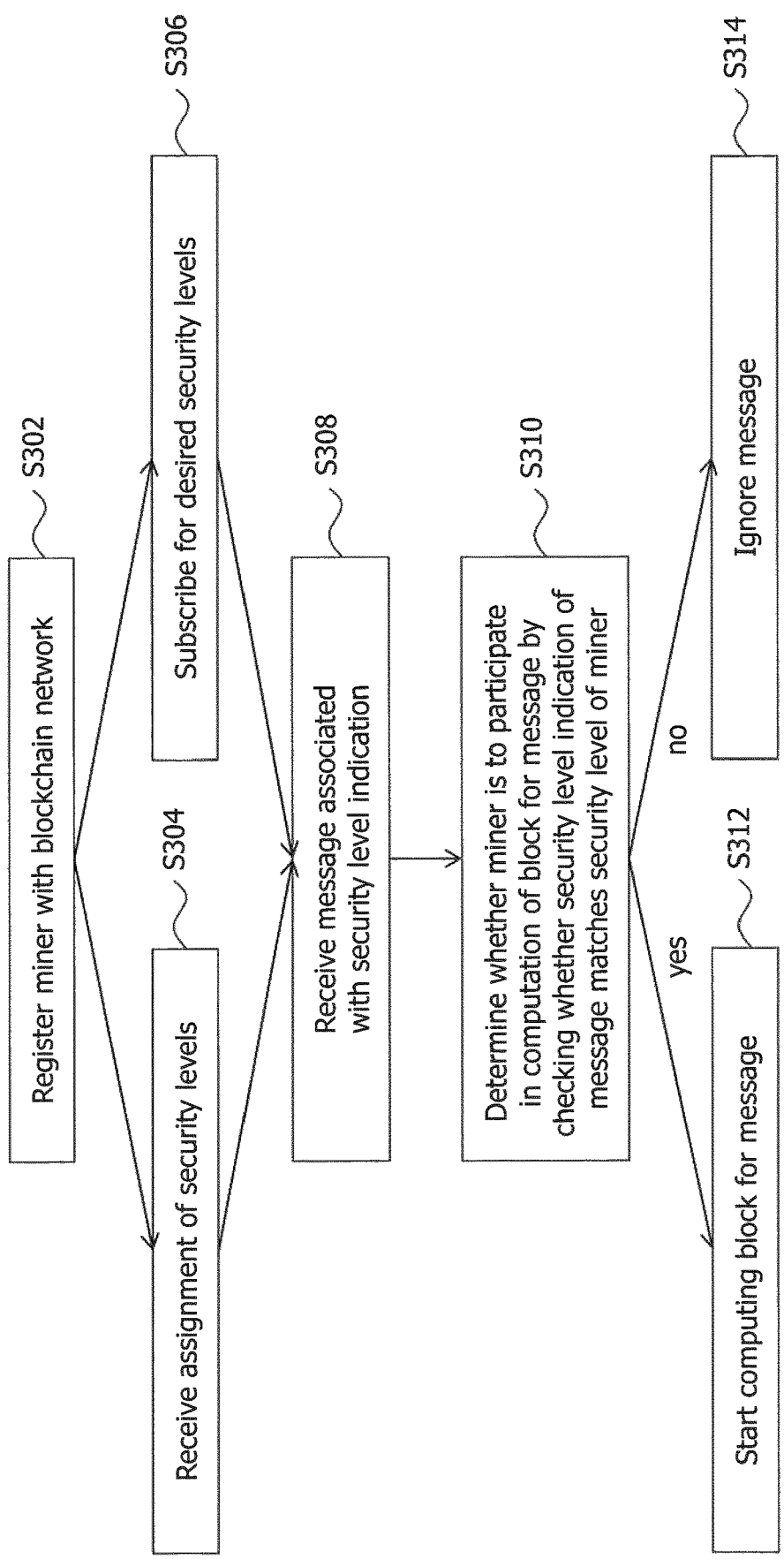

FIG. 3a schematically illustrates an exemplary modular composition of the miner 202 and FIG. 3b illustrates a corresponding method embodiment which may be performed by the miner 202 according to the present disclosure. The method is dedicated to controlling participation of the miner 202 in a computation of a block for a message to be added to a blockchain in a blockchain network. The basic operation of the miner 202 will be described in the following with reference to both FIGS. 3a and 3b.

The miner 202 operates in a blockchain network which may comprise a plurality of nodes, wherein each of the plurality of nodes (or a subset thereof) may act as miner that may participate in computing the block for a message to be added to the blockchain of the blockchain network. The miner 202 may be configured to perform block computation for messages of one or more security levels available in the blockchain network.

Configuring the miner 202 with the one or more security levels may involve an interaction with the managing node 222 of the blockchain network. In step S302, a miner registration module 302 of the miner 202 may thus register the miner 202 with the managing node 222. In one variant, a security level assignment reception module 304 of the miner 202 may then receive, in step S304, an assignment of the one or more security levels from the managing node 222 for configuring the miner 202 to perform block computation for messages of the one or more security levels. In this case, the one or more security levels may be determined by a network operator and be assigned to the miner 202. Alternatively, a security level subscription module 306 of the miner 202 may subscribe, in step S306, for the one or more security levels at the managing node 222 for configuring the miner 202 to perform block computation for messages of the one or more security levels. In this case, the miner 202 may select autonomously for which security levels the miner 202 desires to perform block computation in the blockchain network.

In an exemplary subscription procedure, the miner 202 may register with a network operator's server which, in turn, may return a secure temporary ticket to both the miner 202 and the managing node 222. The miner 202 may then generate a private key and a public key, sign the ticket with the private key and send it to the managing node 222. The managing node 222, in turn, may check the validity of the ticket and the signature of the miner 202 and, if the ticket is determined to be valid, the managing node 222 may broadcast the miner's public key as well as the list of supported service level indications of the miner 202 into the network to inform the nodes of the blockchain network (including the originating node 212) about the one or more security levels configured for the miner 202. If, on the other hand, the ticket is determined to be invalid, the managing node 222 may send a rejection to the miner 202, for example.

The managing node 222 may be an OSS node of the network, for example, but it will be understood that other nodes of the blockchain network may act as managing node 222 as well. Further, the miner 202 may authenticate itself to the blockchain network (e.g., to the managing node 222) in order to make the miner 202 identifiable for the blockchain network. This may allow the managing node 222 to monitor the miner 202 to check whether the miner 202 operates according to its configuration.

The above-mentioned registration, subscription and/or authentication procedures may be required to implement the technique presented herein in both public blockchain networks (where, traditionally, any node can participate in a blockchain-based service, such as in globally available cryptocurrencies) and private blockchain networks. An example of a private blockchain network may be a mobile network in which the network operator provides blockchain-based services to end users. In such a case, nodes of the mobile network itself and/or nodes external to the mobile network (which are authenticated with the network) may act as miners. In the latter case, the external miners (e.g., end user devices) may be rewarded by the network operator to compensate for the offered computational resources, for example.

After the miner 202 is configured to perform block computation for messages of one or more security levels available in the blockchain network, a message reception module 308 of the miner 202 may receive, in step S308, a message from the originating node 212. The message received by the miner 202 may correspond to a message which is sent (e.g., broadcast) from the originating node 212 to a destination node in the blockchain network, wherein the miner 202 receives the message for validation and block computation purposes. In step S310, a participation determination module 310 of the miner 202 may then check whether the security level indication associated with the message matches one of the one or more security levels configured for the miner 202 to determine whether the miner 202 is to participate in the computation of the block for the message. If it is determined that the miner 202 is to participate in the computation of the block of the message, a block computation module 312 of the miner 202 may start, in step S312, computing the block for the message. Otherwise, if it is determined that the miner 202 is not to participate in the computation of the block for the message, the block computation module 312 of the miner 202 may not start to compute the block for the message, e.g., the miner 202 may simply ignore the message for block computation.

When the miner 202 starts to compute the block for the message in step S312, the miner 202 may be one of a plurality of miners in the blockchain network that start to compute the block as part of a consensus procedure employed in the blockchain network, and thereby "participate" in the computation of the block. Each participating miner may start to compute the block separately (e.g., in parallel), wherein the first miner that successfully completes computing the block may notify the other miners to reach consensus about the computed block. The consensus procedure may be a proof-based procedure, such as one of the proof-of-work, proof-of-state, proof-of-capacity, proof-of-burn, or proof-of-activity procedures mentioned above. In case of the proof-of-work procedure, for example, each of the plurality of miners may start computing a proof-of-work for the block, wherein the first miner which finds a solution to the proof-of-work may broadcast the solution to the other miners for validation. If the other miners accept the solution, the block may be added to the blockchain and the nodes of the blockchain network may update their ledger accordingly. The general procedure of computing the block for the message may correspond to the block creation procedure for new messages to be added to a blockchain described above for traditional blockchain networks. Unnecessary repetitions are thus omitted at this point.

The security level indication associated with the message may be set by the originating node 212. In particular, the security level indication may be included in the message so that, when the miner 202 checks whether the security level indication matches one of the one or more security levels configured for the miner 202, the miner 202 may directly read the security level indication from the message and proceed accordingly. The security level indication may be added to the message by the originating node 212 when generating the message, for example. It will be understood that other ways of conveying the security level indication associated with the message to the miner are generally conceivable.

Rather than in traditional blockchain networks, according to the technique presented herein, participation of the miners in the block computation for messages exchanged in the blockchain network may be controlled based on security level indications associated with the messages. For this purpose, as said, the miner 202 may be configured to perform block computation for messages of one or more particular security levels defined by the blockchain network and, depending on the security level indication associated with the received message, the miner 202 may participate in the computation of the block for the message (e.g., only) when the security level indication associated with the message corresponds to one of the one or more security levels configured for the miner 202, i.e., in other words, when the miner 202 is configured to be responsible for computing the block for the message. By setting the security level indication for a message, it may be controlled that certain miners of the blockchain network participate in the computation of the block for the message, while others do not participate.

Controlling participation of miners in the computation of the block for a message on the basis of security levels generally stems from the observation that information being exchanged in a blockchain network may have different security requirements (e.g., in terms of confidentiality, integrity, and availability of data). While, for messages which carry sensitive data, higher security requirements may applied, messages which carry less sensitive data may have lower security requirements. This may be the case in networks that offer blockchain-based services to different applications, for example. As an example, a firmware update for an IoT device may require a higher level of security than the data which is generated by a temperature sensor in the IoT environment. Using the technique presented herein, different security requirements may be reflected by the security level indication associated with the message. The security level indication associated with the message may thus correspond to a level of sensitivity of data included in the message or, in other words, the security level indication associated with the message may classify the data included in the message based on its security demands. A higher/lower security level may indicate higher/lower security requirements.

In blockchain networks, the level of security provided for a message to be added to the blockchain may be directly related to the computational power that is spent for the computation of the block. This is because, as the number of processors in the blockchain network increases (e.g., more miners and/or more CPUs per miner are available), the degree of difficulty of the consensus procedure (e.g., the proof-of-work computation) may generally need to increase if the average time for computing a block is to be constant. Consequently, a higher security level may be achieved when a higher number of miners participates in the computation of the block, whereas a lower security level may result from the fact that a lower number of miners participates in the computation of the block. For messages with lower security requirements, utilizing all miners in the blockchain network may waste computational power and unnecessarily increase energy consumption. The security level indication associated with the message may thus be used to control the level of computational power and energy consumption required for the computation of the block, depending on the level of security required for the message.

FIG. 4 illustrates an exemplary assignment of security levels to a plurality of miners in the blockchain network. More specifically, FIG. 4 illustrates a level-wise increase of the number of miners that participate in the computation of the block for a message so that a higher security level is achieved for messages with higher security requirements, and vice versa. In the shown example, in case of a message with the lowest security level indication SLI=1, only miners 1 to j participate in computing the block for the message, while miners j+1 to N do not participate, thereby providing lowest security for the message. In case of a message with security level indication SLI=2, miners 1 to j+1 participate in computing the block for the message, while miners j+2 to N do not participate, and so on. In case of a message with highest security level indication SLI=i, on the other hand, all miners 1 to N of the blockchain network participate in computing the block for the message, thereby providing highest security for the message.

As stated above, in one variant, the security level indication associated with the message may be included in the message. FIGS. 5a and 5b illustrate variants of incorporating a security level indication into a message. In one such variant shown in FIG. 5a, the security level indication may be incorporated into the message before applying a hash function to the message (in the shown example, the security level indication is simply appended to the data of the message). In this case, the hash value of the message may correspond to a hash value generated from data included in the message and the security level indication. In another variant shown in FIG. 5b, the security level indication may be hashed separately from the data and, then, the hash value of the data and the hash value of the security level indication may be combined to obtain a final hash value. In this case, the hash value of the message may correspond to a hash value generated from a hash value of data included in the message and a hash value of the security level indication. In both of these variants, the (direct or indirect) inclusion of the security level indication into the calculation of the hash value of the message may cause that different hash values result from different security level indications, even though the data included in the message may be the same. The miner 202 may then obtain the security level indication from the message by computing hash values of the message with different assumed security level indications and comparing the computed hash values with the actual hash value of the message, for example.

It will be understood that such variants of including the security level indication in the message are merely exemplary and that other forms of inclusion are generally conceivable. It is even conceivable that the security level indications are sent directly (e.g., unhashed) to the miner 202. The number of bits required for inclusion of the security level indications in the messages may depend on the number of security levels defined by the blockchain network. The security level indications may be added at the application layer and may therefore not affect lower protocol layers. If the security level indication is included into the calculation of the hash value of the message, as described above, the length of data in lower protocol layers remains the same as in traditional blockchains systems because the hash value of the message computed at the application layer always has the same length.

Figure 6A:
FIGS. 6a and 6b illustrate a modular composition of the originating node and a corresponding method embodiment which may be performed by the originating node.
Figure 6B:
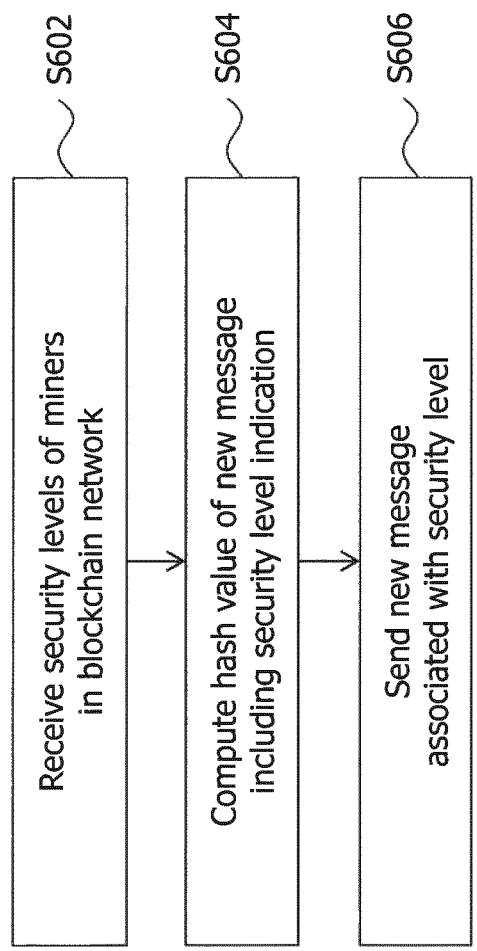

FIG. 6a schematically illustrates an exemplary modular composition of the originating node 212 and FIG. 6b illustrates a corresponding method embodiment which may be performed by the originating node 212 according to the present disclosure.

The method is dedicated to controlling participation of a plurality of miners (including the miner 202) in a computation of a block for a message to be added to a blockchain in a blockchain network. The basic operation of the originating node 212 will be described in the following with reference to both FIGS. 6a and 6b. This operation may be complementary to the operation of the miner 202 described above in relation to FIGS. 3a, 3b, 5a and 5b and, as such, aspects described above with regard to the operation of the originating node 212 may be applicable to the operation of the originating node 212 described in the following as well. Unnecessary repetitions are thus omitted.

In order to know about the security levels supported by the miners (including the miner 202) of the blockchain network and to be able to control participation of the plurality of miners in the computation of the block for the message, a security level reception module 602 of the originating node 212 may receive, in step S602, for each of the plurality of miners, the one or more security levels configured for the respective miner from the managing node 222.

When the originating node 212 is then about to send the message to the destination node (e.g., by broadcasting the message into the blockchain network), the message needs to be generated by the originating node 212. In order to include the security level indication associated with the message into the message as part of the generation process, a hash value computation module 604 of the originating node 212 may compute, in one variant of step S604, a hash value of the message as a hash value generated from data included in the message and the security level indication. In another variant of step S604, the hash value computation module 604 may compute the hash value of the message as a hash value generated from a hash value of data included in the message and a hash value of the security level indication. This computation may produce the results described above with reference to FIGS. 5a and 5b.

When the message is generated and ready to be sent, a message sending module 606 of the originating node 212 may send (e.g., broadcast), in step S606, the message to the plurality of miners (including the miner 202), wherein the message is associated with a security level indication enabling each of the plurality of miners to determine whether the respective miner is to participate in the computation of the block for the message by checking whether the security level indication associated with the message matches one of the one or more security levels configured for the respective miner.

Figure 7A:
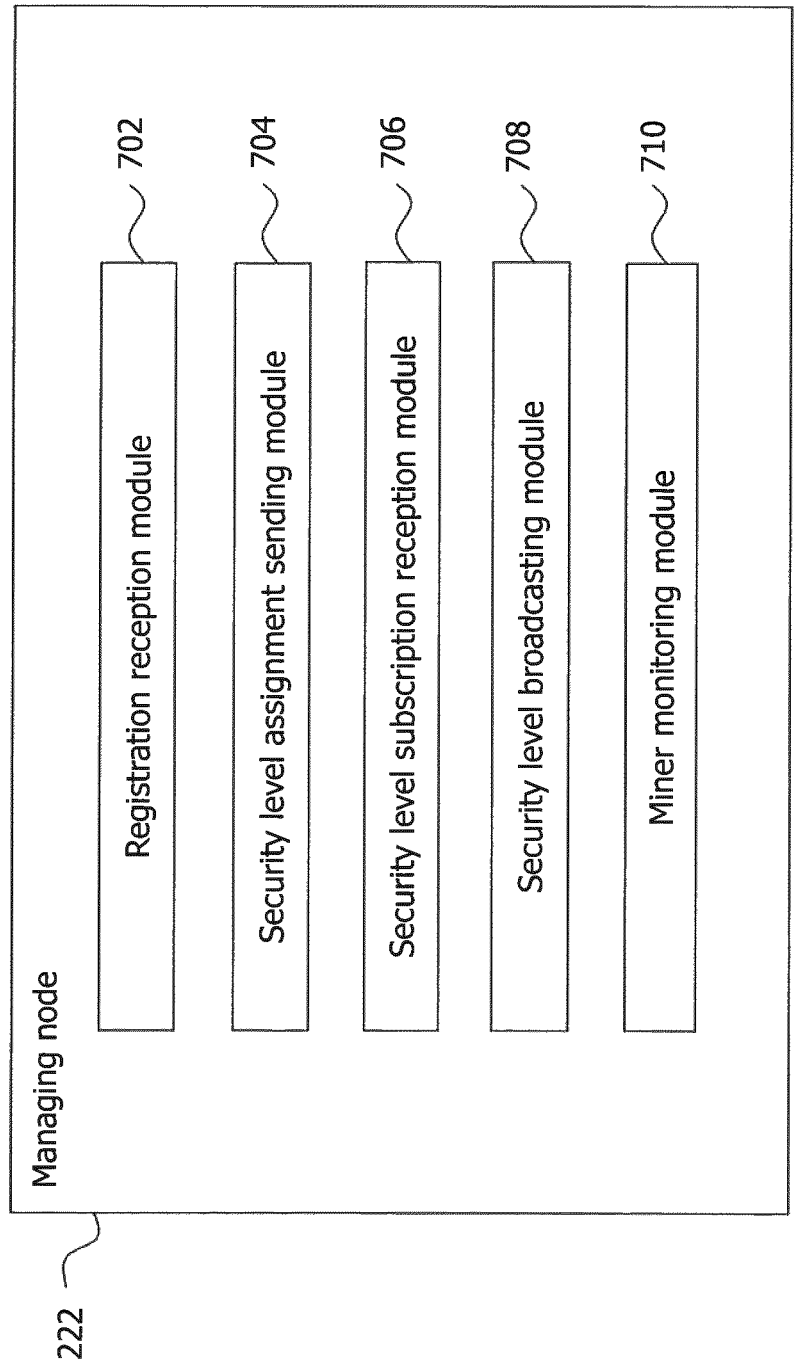

FIG. 7a schematically illustrates an exemplary modular composition of the managing node 222 and FIG. 7b illustrates a corresponding method embodiment which may be performed by the managing node 222 according to the present disclosure. The method is dedicated to controlling participation of a miner in a computation of a block for a message to be added to a blockchain in a blockchain network. The basic operation of the managing node 222 will be described in the following with reference to both FIGS. 7a and 7b. This operation may be complementary to the operation of the miner 202 described above in relation to FIGS. 3a, 3b, 5a and 5b as well as the operation of the originating node 212 described above in relation to FIGS. 6a, 6b and, as such, aspects described above with regard to the operation of the managing node 222 may be applicable to the operation of the managing node 222 described in the following as well. Unnecessary repetitions are thus omitted.

In line with the registration, subscription and/or authentication procedures described above in relation to FIGS. 3a and 3b, a registration reception module 702 of the managing node 222 may receive, in step S702, a registration request for registering the miner 202 with the managing node 222. In one variant (e.g., in which the one or more security levels may be defined by a network operator), a security level assignment sending module 704 of the managing node 222 may then send, in step S704, an assignment of the one or more security levels to the miner 202 for configuring the miner 202 to perform block computation for messages of the one or more security levels. Alternatively (e.g., when the miner 202 may select autonomously for which security levels the miner 202 desires to perform block computation), a security level subscription reception module 706 of the managing node 222 may receive, in step S706, a subscription for the one or more security levels from the miner 202 for configuring the miner 202 to perform block computation for messages of the one or more security levels. In order to inform the nodes of the blockchain network (including the originating node 212) about the one or more security levels configured for the miner 202, a security level broadcasting module 708 of the managing node 222 may broadcast, in step S708, the one or more security levels configured for the miner into the blockchain network.

As said above, the miner 202 may authenticate itself to the blockchain network (e.g., to the managing node 222) in order to make the miner 202 identifiable for the blockchain network, which may allow the managing node 202 to monitor the miner 202 to check whether the miner 202 operates according to its configuration. In particular, a miner monitoring module 710 of the managing node 222 may monitor, in step S710, the miner 202 to check whether the miner 202 computes the block for the message only if a security level indication associated with the message matches one of the one or more security levels configured for the miner.

Figure 8:
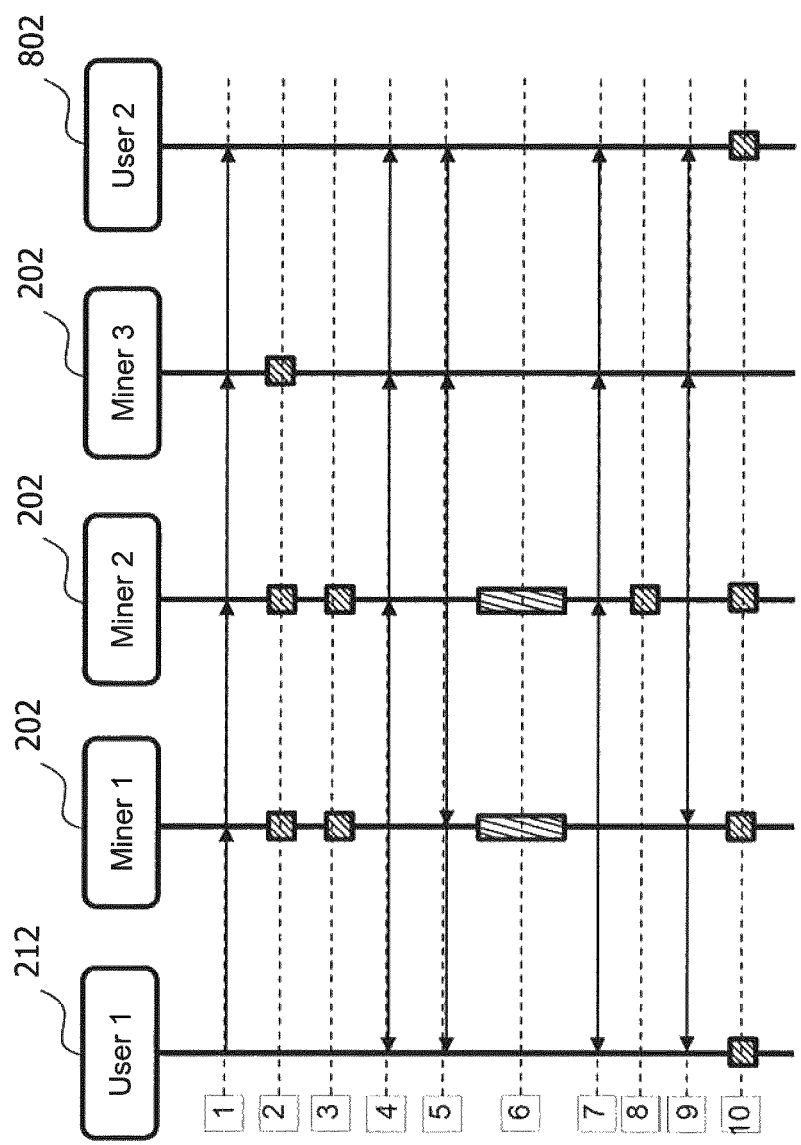
FIG. 8 illustrates an exemplary sequence of operations performed when a new message is to be added to a blockchain of a blockchain network according to the present disclosure.

FIG. 8 illustrates an exemplary sequence of operations performed when a new message is to be added to a blockchain of the blockchain network. In the shown example, a message is sent from originating node 212 (denoted as "user 1") to a destination node 802 (denoted as "user 2") in the blockchain network and it is assumed that the message is associated with SLI=1. In this example, the blockchain network comprises three nodes acting as miners 202. Among the miners, miners 1 and 2 are responsible for performing block computation for messages with SLI=1 and SLI=2, while miner 3 is responsible for performing block computation for messages with SLI=2.

In step 1 of the exemplary procedure, user 1 broadcasts the message associated with SLI=1 to user 2 and, in step 2, all miners determine if they are responsible to perform block computation for the message by checking whether one of their configured security levels match the SLI=1 associated with the message. As a result, miners 1 and 2 determine that they are to participate in the computation of the block for the message, whereas miner 3 determines that it is not to participate in the computation of the block as it is not responsible for SLI=1. Miner 3 thus ignores the message in the following. In step 3, miners 1 and 2 validate the message. This validation may be performed as described above for traditional blockchain networks using digital signatures. In step 4, miner 1 broadcasts its validation result into the blockchain network and, in step 5, miner 2 broadcasts its validation result into the blockchain network. Assuming that both validations are successful, both miners 1 and 2 start to compute the block for the message in step 6, e.g., by starting to compute a corresponding proof-of-work. In the shown example, miner 1 is the first miner that finds a solution (i.e., a fully computed block) and broadcasts the solution into the blockchain network in step 7. In step 8, miner 2 validates the block computed by miner 1 and broadcasts, in step 9, the validation result indicating either acceptance or rejection of the solution into the blockchain network. Assuming acceptance by miner 2, the concerned nodes, i.e., user 1, user 2, miner 1 and miner 2 update their ledger for SLI=1 accordingly. Miner 3 may not update its ledger as miner 3 is not responsible for SLI=1.

From the above, it generally follows that a blockchain network may comprise a single blockchain. In such a case, all validated blocks may be stored in the single blockchain, regardless of the values of the security level indications associated with the message that becomes part of a block. As the number of miners that compute the block may vary depending on the security level, as described above, the security levels of the blocks of the blockchain (and the associated degree of difficulty used for computing the blocks, for example) may differ.

Figure 9A:
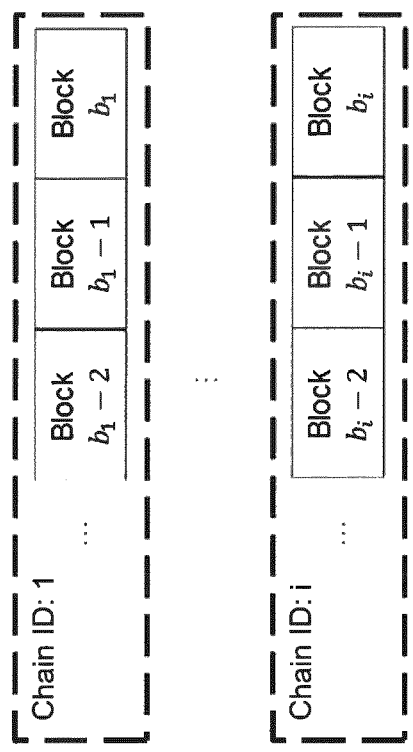
FIGS. 9a and 9b illustrate exemplary implementations supporting multiple blockchains, wherein each respective blockchain contains messages of a particular security level indication or messages of a distinct cluster of security level indications.
Figure 9B:
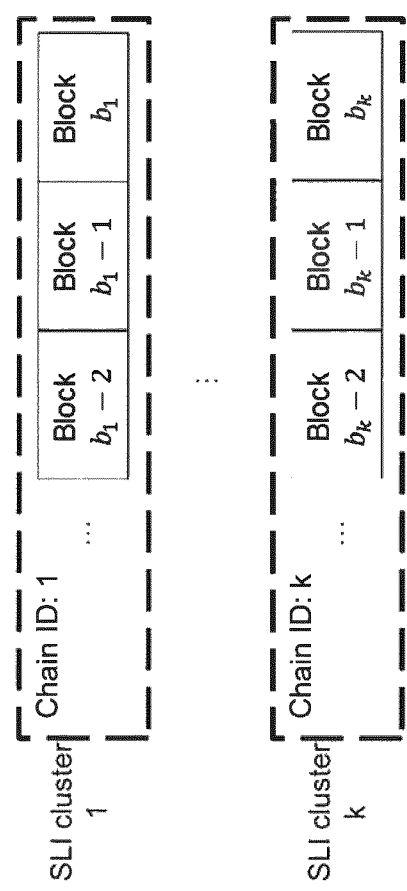

FIGS. 9a and 9b illustrate exemplary implementations that support multiple blockchains. In the example of FIG. 9a, the blockchain may be one of a plurality of blockchains of the blockchain network and the miner 202 may be responsible for computing blocks of the plurality of blockchains. Each of the plurality of blockchains may have a chain identifier, and the chain identifier of the respective blockchain may correspond to (or match) the security level indication of all messages added to the respective blockchain. In other words, each of the multiple blockchains may specifically contain validated blocks computed for messages which have a particular security level indication value only. When a message is to be added to one of the plurality of blockchains, the miner may add the block for the message, once successfully computed, to the blockchain which has a chain identifier that corresponds to the security level indication of the message. In this way, messages may be stored in different blockchains based on their security level indication and it may thus be ensured that messages which are associated with a higher/lower security level indication end up in a blockchain supporting a higher/lower security level. The multi-chain system may have the benefit that data is stored in different chains based on the security level indication value and the resultant separation can ease the management and processing effort of different types of data.

In the exemplary implementation of FIG. 9b, the blockchain may be one of a plurality of blockchains as well. In this implementation, however, each of the plurality of blockchains may include a distinct cluster of security level indications of messages added to the respective blockchain. In such a case, each of the plurality of blockchains may include messages of several security levels (i.e., a cluster of security level indications). When a message is to be added to one of the plurality of blockchains, the miner may first determine to which of the distinct clusters of security level indications the message belongs and, once successfully computed, add the block to the corresponding blockchain. This implementation may be seen as a hybrid approach of the single blockchain case and the multiple blockchain case described above.

As has become apparent from the above, the present disclosure provides a technique for controlling participation of one or more miners in a computation of a block for a message to be added to a blockchain in a blockchain network. The technique may provide an approach to trade off computational power and energy consumption against security robustness in networks offering blockchain-based services. While in traditional blockchain networks, all miners of the blockchain network may be utilized for block computation (even for messages with lower security requirements) and, therefore, computational power and energy consumption may be wasted, the technique presented herein may be used to control the level of computational power and energy consumption required for the computation of a block, depending on the level of security required for the message. A lower number of miners may generally lead to lower energy consumption network-wide because less nodes must perform the CPU-intense block computation. In other words, the technique presented herein may be said to allow the blockchain network to perform consensus procedures (e.g., proof-of-work computation) in an energy-efficient manner. At the same time, the presented technique may provide for improved network capacity utilization. Also, the technique can be easily implemented using software and configuration upgrades in existing blockchain networks to support the functionality described herein.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for controlling participation of a miner in a computation of a block for a message to be added to a blockchain in a blockchain network, the miner being configured to perform block computation for messages of one or more security levels available in the blockchain network, the method being performed by the miner and comprising:
- receiving the message;
- checking whether a security level indication associated with the message matches one of the one or more security levels configured for the miner to determine whether the miner is to participate in the computation of the block for the message; and
- starting to compute the block for the message as a result of determining that the miner is to participate in the computation of the block for the message, wherein
- the security level indication associated with the message corresponds to a level of sensitivity of data included in the message.

2. The method of claim 1, further comprising:
- not starting to compute the block for the message as a result of determining that the miner is not to participate in the computation of the block for the message.

3. The method of claim 1, wherein the security level indication associated with the message is set by an originating node of the message in the blockchain network.

4. The method of claim 1, further comprising:
- registering, prior to receiving the message, the miner with the blockchain network.

5. The method of claim 1, further comprising:
- receiving, prior to receiving the message, an assignment of the one or more security levels from a managing node of the blockchain network for configuring the miner to perform block computation for messages of the one or more security levels.

6. The method of claim 1, further comprising:
- subscribing, prior to receiving the message, for the one or more security levels at a managing node of the blockchain network for configuring the miner to perform block computation for messages of the one or more security levels.

7. The method of claim 1, wherein a hash value of the message corresponds to a hash value generated from data included in the message and the security level indication.

8. The method of claim 1, wherein a hash value of the message corresponds to a hash value generated from a hash value of data included in the message and a hash value of the security level indication, and the method further comprises:
- obtaining the security level indication from the message by computing hash values of the message with different assumed security level indications and comparing the computed hash values with the hash value of the message.

9. The method of claim 1, wherein
- the blockchain is one of a plurality of blockchains of the blockchain network, wherein each of the plurality of blockchains has a chain identifier, and wherein the chain identifier of the respective blockchain corresponds to security level indication of all messages added to the respective blockchain, or
- the blockchain is one of a plurality of blockchains of the blockchain network, and wherein each of the plurality of blockchains includes a distinct cluster of security level indications of messages added to the respective blockchain.

10. A computer program product comprising a non-transitory computer readable medium comprising program code portions for performing the method of claim 1 when the computer program product is executed on one or more computing devices.

11. A miner for participating in a computation of a block for a message to be added to a blockchain in a blockchain network, the miner comprising:
- at least one memory; and
- at least one processor coupled to the memory, wherein the miner is configured to:
- perform block computation for messages of one or more security levels available in the blockchain network, and
- perform the method of claim 1.

12. A method for controlling participation of a plurality of miners in a computation of a block for a message to be added to a blockchain in a blockchain network, each of the plurality of miners being configured to perform block computation for messages of one or more security levels available in the blockchain network, the method being performed by an originating node of the message and comprising:
- sending the message to the plurality of miners, the message being associated with a security level indication enabling each of the plurality of miners to determine whether the respective miner is to participate in the computation of the block for the message by checking whether the security level indication associated with the message matches one of the one or more security levels configured for the respective miner, wherein
- the security level indication associated with the message corresponds to a level of sensitivity of data included in the message, and
- the method further comprises:
  - computing a hash value of the message as a hash value generated from data included in the message and the security level indication, and/or
  - computing a hash value of the message as a hash value generated from a hash value of data included in the message and a hash value of the security level indication.

13. The method of claim 12, further comprising:
- receiving, for each of the plurality of miners, the one or more security levels configured for the respective miner from a managing node of the blockchain network.

14. An originating node, the originating node comprising:
- at least one memory; and
- at least one processor coupled to the memory, wherein the originating node is configured to:
- control participation of a plurality of miners in a computation of a block for a message to be added to a blockchain in a blockchain network, each of the plurality of miners being configured to perform block computation for messages of one or more security levels available in the blockchain network, and
- perform the method of claim 13.

15. A method for controlling participation of a miner in a computation of a block for a message to be added to a blockchain in a blockchain network, the miner being configured to perform block computation for messages of one or more security levels available in the blockchain network, the method comprising:
- determining whether a security level indication associated with the message matches one of the one or more security levels configured for the miner, wherein the security level indication associated with the message corresponds to a level of sensitivity of data included in the message;
- monitoring the miner to check whether the miner starts to compute the block for the message as a result of determining the security level indication associated with the message matches one of the one or more security levels configured for the miner; and informing one or more nodes of the blockchain network, including a node of the blockchain network that originated the message, about the one or more security levels configured for the miner.

16. The method of claim 15, further comprising:

sending, prior to monitoring the miner, an assignment of the one or more security levels to the miner for configuring the miner to perform block computation for messages of the one or more security levels.

17. The method of claim 15, further comprising:

receiving, prior to monitoring the miner, a subscription for the one or more security levels from the miner for configuring the miner to perform block computation for messages of the one or more security levels.

18. The method of claim 15, wherein:

informing the one or more nodes of the blockchain network about the one or more security levels configured for the miner comprises broadcasting the one or more security levels configured for the miner into the blockchain network.

19. A managing node, the managing node comprising:

at least one memory; and at least one processor coupled to the memory, wherein the managing node is configured to:

control participation of a miner in a computation of a block for a message to be added to a blockchain in a blockchain network, the miner being configured to perform block computation for messages of one or more security levels available in the blockchain network, and perform the method of claim 15.

* * * * *